US006946830B1

(12) United States Patent
Hayashi et al.

(10) Patent No.: US 6,946,830 B1
(45) Date of Patent: Sep. 20, 2005

(54) APPARATUS FOR DETECTING ROTATION ANGULAR POSITIONS OF A ROTOR

(75) Inventors: Tatsuo Hayashi, Saitama (JP); Yoshiaki Hirakata, Saitama (JP)

(73) Assignee: A Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,777

(22) Filed: Jun. 3, 1999

(30) Foreign Application Priority Data

Jun. 3, 1998 (JP) .......................................... 10-154977

(51) Int. Cl.[7] ............................... G01B 7/30; F02P 5/00

(52) U.S. Cl. ............................ 324/207.25; 324/207.22; 123/406.63; 123/617

(58) Field of Search ....................... 324/207.25, 207.15, 324/207.16, 207.22; 123/617, 406.58, 406.62, 406.63

(56) References Cited

U.S. PATENT DOCUMENTS 5,469,823 A * 11/1995 Ott et al. .................... 123/414
5,632,246 A * 5/1997 Suzuki ....................... 123/414

FOREIGN PATENT DOCUMENTS

| | | | |
|---|---|---|---|
| DE | 3602994 | C2 | 11/1989 |
| DE | 3602994 | C | 11/1989 |
| DE | 3307833 | C2 | 12/1993 |
| DE | 4310460 | A1 | 10/1994 |
| DE | 19638338 | A | 4/1998 |
| DE | 19638338 | | 4/1998 |
| JP | 61A-277845 | | 12/1986 |

* cited by examiner

*Primary Examiner*—Jay Patidar
(74) *Attorney, Agent, or Firm*—Birch, Stewart, Kolasch & Birch, LLP

(57) ABSTRACT

A rotation-angular-position detecting apparatus of a rotor is capable of confirming an angular position of a rotation of the rotor within a relatively short period of time following a start of the rotation. The rotation-angular-position detecting apparatus includes a second rotor which rotates in a rotation interlocked with a first rotor with a plurality of first detection members formed at equal intervals in a rotational direction of the first rotor at a predetermined speed ratio with respect to the first rotor, and has a plurality of second detection members formed at unequal intervals in a rotational direction of the second rotor. A second pickup is provided for generating a second detection signal when sensing the proximity of any one of the second detection members on the second rotor. In the rotation-angular-position detecting apparatus, generation of the second detection signal from the second pickup is detected for each generation of the first detection signal from the first pickup due to a rotation of the first rotor. A plurality of specific rotation angular positions of the first rotor are each determined in accordance with a plurality of results of detection obtained so far including a result of the detection of the generation of the second detection signal obtained this time. The number of times the first detection signal is generated after any one of the specific rotation angular positions has been determined is counted to determine a rotation angular position of the first rotor other than the specific rotation angular positions.

6 Claims, 5 Drawing Sheets

APPARATUS FOR DETECTING ROTATION ANGULAR POSITIONS OF A ROTOR

BACKGROUND OF THE INVENTION

1. Field of the Invention

The present invention relates to a rotation-angular-position detecting apparatus for detecting the angular position of the rotation of a rotor.

2. Description of Background Art

To control the fuel injection timing for injecting fuel into an internal combustion engine by using an injector and ignition timing to discharge sparks to an ignition plug, the angular position of the rotation of a crank shaft of the engine is detected by using a rotation-angular-position detecting apparatus. A detected angular position of the rotation is used for setting this kind of timing. The angular position of the rotation is represented by a number called a stage. A reference angular position of the rotation is referred to as stage 0 as is disclosed in Japanese Patent Laid-open No. Sho 61-277845.

In the conventional rotation-angular-position detecting apparatus, 2 disc-shaped rotors are provided. The first rotor is rotated in a rotation interlocked with the rotation of a crank shaft. On the circumference of the first rotor, a plurality of detection members to be detected, like protrusions, are formed at equal intervals. The second rotor is rotated at a speed half that of the rotation of the crank shaft. On the circumference of the second rotor, a single detection piece to be detected is formed at a location corresponding to a reference rotation angular position. A first pickup is provided at a position in close proximity to a rotational locus of the plurality of detection members on the first rotor. The first pickup generates a first detection signal when sensing the proximity of any one of the detection members. On the other hand, a second pickup is provided at a position in close proximity to a rotational locus of the detection piece on the second rotor. The second pickup generates a second detection signal when sensing the proximity of the detection piece. A first detection signal generated by the first pickup right after a point in time when the second pickup generates a second detection signal is regarded as a signal indicating stage 0. Then, the number of first detection signals generated thereafter is counted and a stage of the rotation angular position is determined from the count value.

In the conventional rotation-angular-position detecting apparatus, however, it is not until a second detection signal has been generated by the second pickup to indicate the reference rotation angular position that the rotation angular position can be confirmed. For example, there is thus a case in which the second detection signal is not generated until the first rotor reaches a location in close proximity to an angular position of 720 degrees since the start of the rotations of the first and second rotors. In such a case, there is raised a problem regarding the long time for confirmation of an angular position of the rotation.

SUMMARY AND OBJECTS OF THE INVENTION

It is an object of the present invention to provide a rotation-angular-position detecting apparatus of a rotor that is capable of confirming an angular position of a rotation of the rotor within a relatively short period of time following a start of the rotation.

A rotation-angular-position detecting apparatus for a rotor provided by the present invention is a rotation-angular-position detecting apparatus for detecting an angular position of a rotation of a first rotor provided with a plurality of first detection members at equal intervals in a rotational direction of the first rotor for each of the intervals. The rotation-angular-position detecting apparatus includes a first pickup provided at a position in close proximity to a rotational locus of the plurality of first detection members provided on the first rotor and used for generating a first detection signal when sensing the proximity of any one of the first detection members. A second rotor rotating in a rotation interlocked with the first rotor at a predetermined speed ratio with respect to the first rotor and having a plurality of second detection members provided at unequal intervals in a rotational direction of the second rotor. A second pickup provided at a position in close proximity to a rotational locus of the plurality of second detection members provided on the second rotor and used for generating a second detection signal when sensing the proximity of any one of the second detection members. A detection means for detecting the generation of the second detection signal for each generation of the first detection signal. In addition, a rotation-angular-position determining means is provided whereby a plurality of specific rotation angular positions of the first rotor are each determined in accordance with a plurality of results of the detection of the generation of the second detection signal output by the detection means so far including a result of the detection of the generation of the second detection signal output by the detection means this time. The number of times the first detection signal is generated after any one of the specific rotation angular positions has been determined is counted to determine a rotation angular position of the first rotor other than the specific rotation angular positions.

According to the rotation-angular-position detecting apparatus provided by the present invention with a configuration described above, a second rotor is provided for rotating in a rotation interlocked with a first rotor with a plurality of first detection members formed at equal intervals in a rotational direction of the first rotor at a predetermined speed ratio with respect to the first rotor. The second rotor has a plurality of second detection members formed at unequal intervals in a rotational direction of the second rotor. A second pickup is provided for generating a second detection signal when sensing the proximity of any one of the second detection members provided on the second rotor.

According to the rotation-angular-position detecting apparatus, the generation of the second detection signal from the second pickup is detected for each generation of the first detection signal from the first pickup due to the rotation of the first rotor. A plurality of specific rotation angular positions of the first rotor are each determined in accordance with a plurality of results of the detection obtained so far including a result of the detection of the generation of the second detection signal obtained this time. The number of times the first detection signal is generated after any one of the specific rotation angular positions has been determined is counted to determine a rotation angular position of the first rotor other than the specific rotation angular positions. Thus, once any one of the specific rotation angular positions has been determined, an angular position of the rotation can be confirmed. As a result, an angular position of a rotation of the first rotor can be confirmed within a relatively short period of time following a start of the rotation.

In addition, according to the rotation-angular position detecting apparatus provided by the present invention, the rotation-angular-position determining means is provided with a means which is used to form a judgment as to whether or not a rotation angular position determined at a determination immediately preceding a time to determine a rotation angular position is a rotation angular position immediately preceding the specific rotation angular position. If a rotation angular position determined at the immediately preceding determination is not a rotation angular position immediately preceding the specific rotation angular position, a malfunction caused by the generation of a noise is judged to have occurred. As a result, it is possible to detect a failure and to check the operation with ease during maintenance work.

Furthermore, according to the rotation-angular-position detecting apparatus provided by the present invention, there is provided a means for forming a judgment as to whether or not the number of counted times the first detection signal has been generated exceeds the total number of rotation angular positions of the first rotor. Thus, an outcome of the judgment indicating that the number of counted times the first detection signal has been generated exceeds the total number of rotation angular positions of the first rotor can be interpreted as a broken wire in a connection system of the second pickup. As a result, it is also possible to detect a failure and to check the operation with ease during maintenance work.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
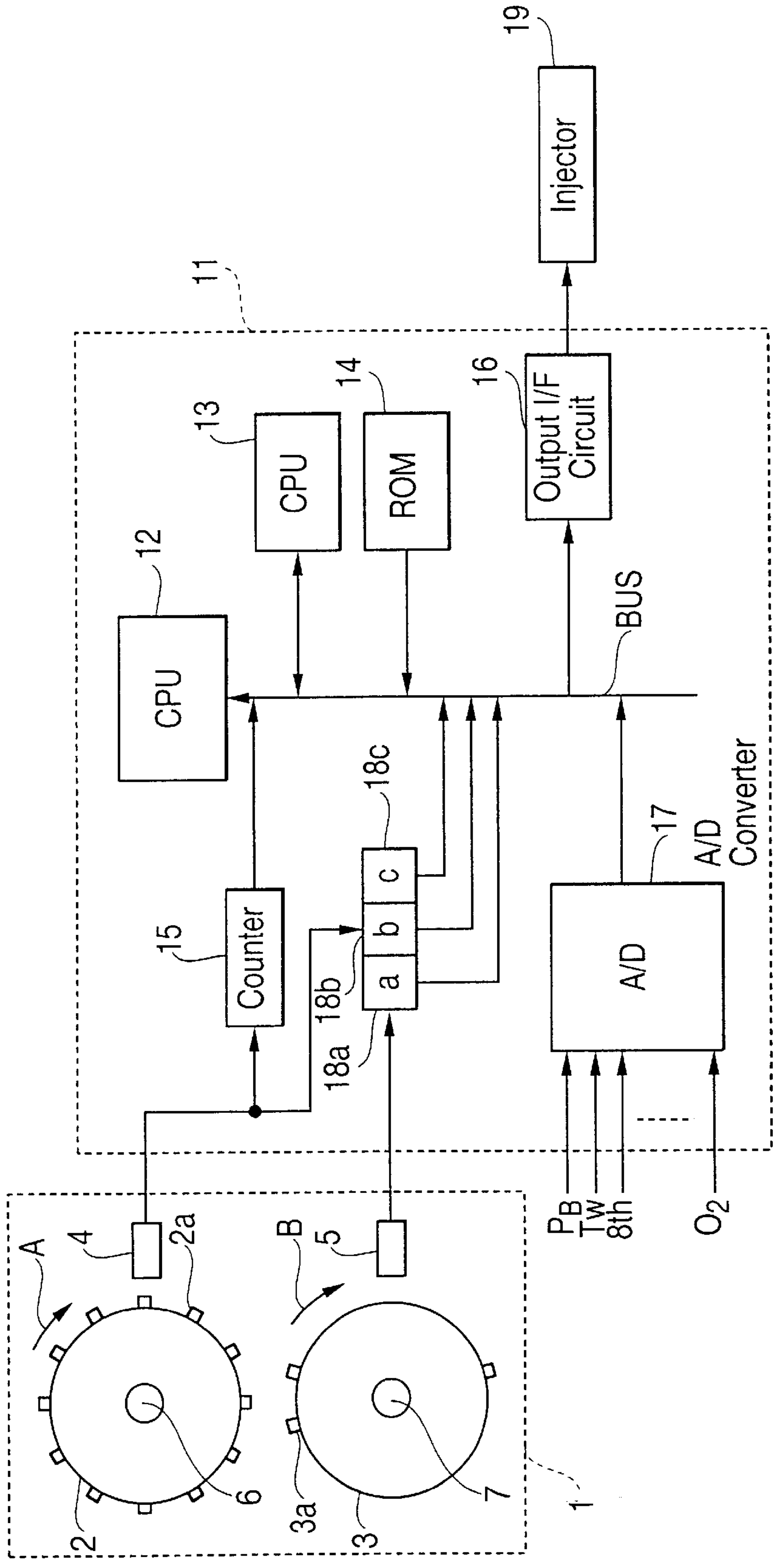
FIG. 1 is a block diagram showing an embodiment of the present invention.

FIG. 1 is a diagram showing an engine control system of an internal combustion engine applying a rotation-angular-position detecting apparatus provided by the present invention. In the engine control system, a crank-angle sensor 1 has 2 rotors 2 and 3 as well as 2 electromagnetic pickups 4 and 5. The first rotor 2 is rotated in a rotation interlocked with a crank shaft 6 of the internal combustion engine in a direction indicated by an arrow A at the same rotational speed as that of the crank shaft 6. On the circumference of the rotor 2, 12 protrusions (first detection members) 2*a,* each made of a magnetic material, are provided sequentially at angular intervals of 30 degrees. The electromagnetic pickup (first pickup) 4 is installed at a location in close proximity to the rotor 2. In this arrangement, each time the rotor 2 rotates in a rotation interlocked with the crank shaft 6 of the engine by 30 degrees, the electromagnetic pickup 4 generates a crank pulse (first detection signal). The second rotor 3 is fixed on a cam shaft 7 which rotates in a direction indicated by an arrow B at half the rotational speed of the crank shaft 6. On the circumference of the rotor 3, 3 protrusions (second detection members) 3*a*, each made of a magnetic material, are provided at angular positions of 30, 150 and 180 degrees respectively. An electromagnetic pickup (second pickup) 5 is installed at a location in close proximity to the rotor 3. The rotor 3 is rotated in a rotation interlocked with the crank shaft 6 of the engine. In this arrangement, as a protrusion 3*a* on the rotor 3 approaches the electromagnetic pickup 5, a cylinder pulse (second detection signal) is generated by the electromagnetic pickup 5. The cylinder pulses are generated at rotational angles of 60, 300 and 360 degrees of the crank shaft 6. In addition, the rotors 2 and 3 are set so that the cylinder pulses are each generated during a period of time between 2 consecutive crank pulses.

The outputs of the electromagnetic pickups 4 and 5 of the crank-angle sensor 1 are connected to an ECU (Electric Control Unit) 11. The ECU 11 comprises a CPU 12, a RAM unit 13, a ROM unit 14, a counter 15, an output interface (I/F) circuit 16 and an A/D converter 17. A crank pulse output by the electromagnetic pickup 4 is supplied to the CPU 12 and the counter 15. The counter 15 is reset by a crank pulse output by the electromagnetic pickup 4 and then counts the number of clock pulses output by a clock generator which is not shown in the figure. The number of generated clock pulses is counted to generate a signal representing a revolution speed Ne of the internal combustion engine. It should be noted that the CPU 12, the RAM unit 13, the ROM unit 14, the counter 15, the output interface circuit 16 and the A/D converter 17 are connected to each other by a bus denoted by notation BUS.

In addition, the ECU 11 is also provided with a shift register 18. The shift register 18 has three 1-bit storage devices 18*a* to 18*c*. An output of the electromagnetic pickup 5 is supplied to the shift register 18. As described above, when a protrusion 3*a* on the rotor 3 rotating at half the rotational speed of the rotor 2 approaches the electromagnetic pickup 5, a cylinder pulse is generated. When the cylinder pulse is supplied to the shift register 18, bit data representing 1 is temporarily stored in a buffer in the shift register 18 before being transferred to the storage device 18*a* synchronously with a crank pulse. It should be noted that the buffer itself is not shown in the figure. When no cylinder pulse is supplied to the shift register 18, on the other hand, bit data representing 0 is temporarily stored in the buffer in the shift register 18 before being transferred to the storage device 18*a* synchronously with a crank pulse. In addition, bit data stored in the storage device 18*b* is shifted to the storage device 18*c* and bit data stored in the storage device 18*a* is shifted to the storage device 18*b* in synchronization with a crank pulse. Members of bit data stored in the storage devices 18*a* to 18*c* of the shift register 18 can be output to the bus BUS.

The A/D converter 17 converts analog signals, generated by a plurality of sensors for detecting operating parameters of the internal combustion engine that are required in the control of the engine, into digital signals. The operating parameters include an intake manifold pressure PB, a cooling-water temperature TW, a throttle opening $\theta_{th}$ and an oxygen concentration $O_2$ in the exhausted gas. The CPU 12 executes a fuel-injection control routine stored in the ROM unit 14 in advance to determine a fuel injection duration Tout based on these engine operating parameters and the engine revolution speed Ne. The CPU 12 then issues an injector driving command requesting injection of fuel for a period of time indicated by the determined fuel injection duration Tout. In turn, the output interface circuit 16 drives an injector 19 in accordance with the injector driving command received from the CPU 12. Installed at a location in close proximity to an intake pipe of the internal combustion engine, the injector 19 injects fuel when driven by the output interface circuit 16.

Various kinds of timing such as timing to inject fuel and timing of ignition by a spark plug are determined in accordance with a stage denoted by notation STAGE. The stage represents an angular position of the rotation which is determined by execution of a stage determining routine. There are 24 stages, namely, STAGE=0 to STAGE=23, which are recognized by using crank pulses. STAGE=0 represents a reference rotation angular position. The stage determining routine is executed by the CPU 12 as an interrupt processing routine in response to a generated crank pulse as follows.

Figure 2:
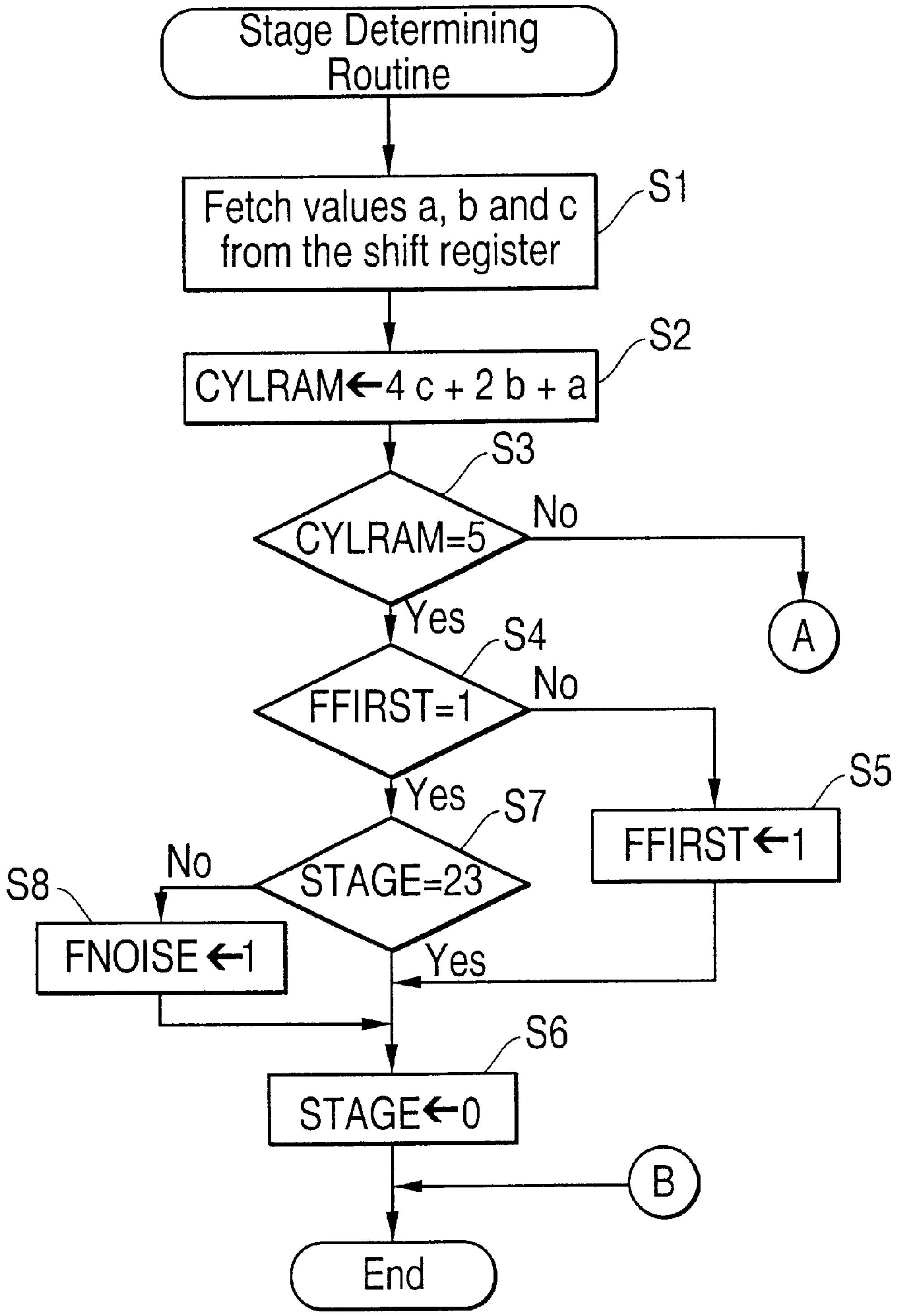
FIG. 2 is a flowchart representing a stage determining routine.
Figure 3:
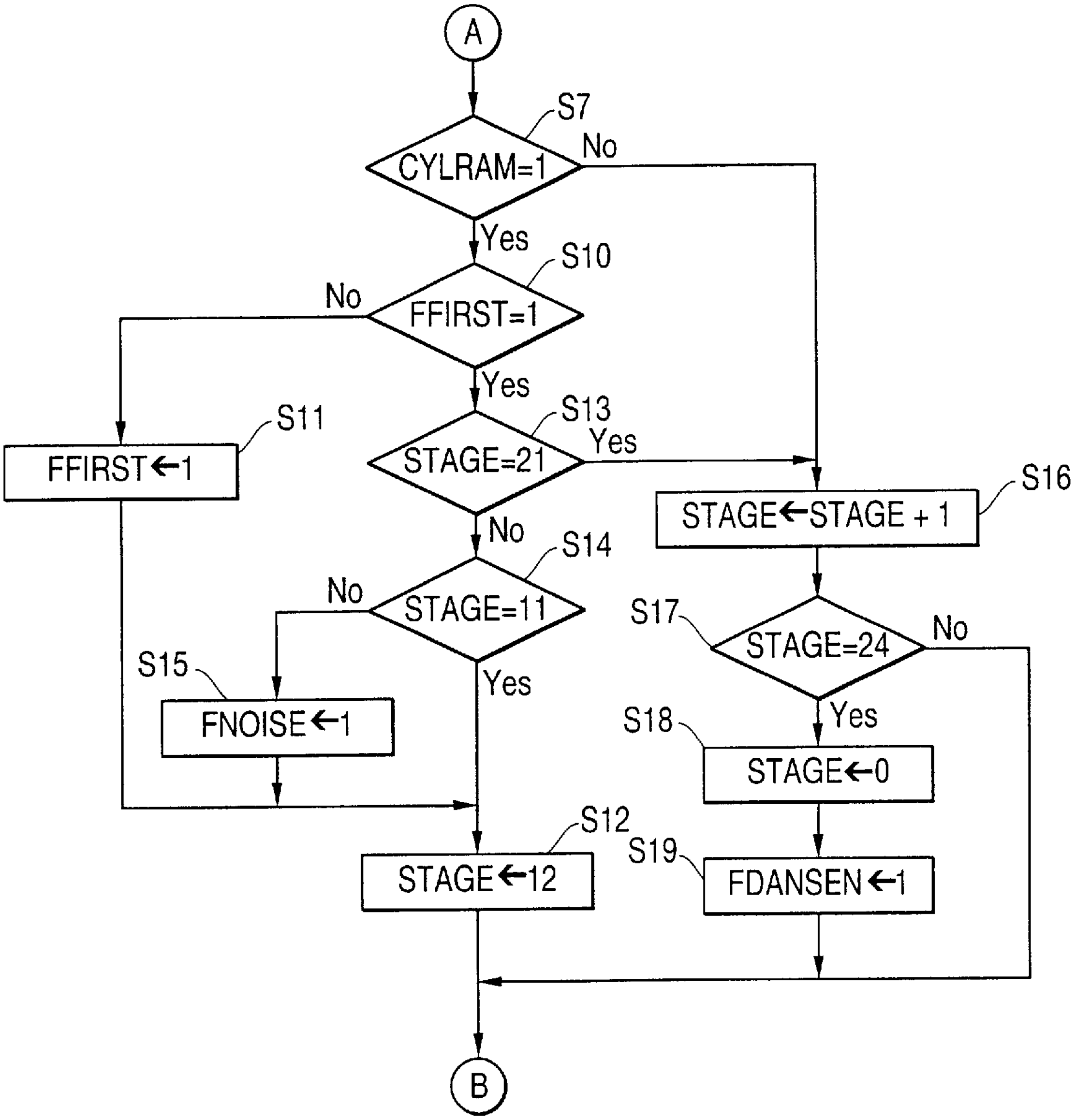
FIG. 3 is a flowchart of the continuation of that shown in FIG. 2.

As shown in FIGS. 2 and 3, the stage determining routine begins with a step S1 at which the CPU 12 fetches values a, b and c stored in the storage devices 18*a* to 18*c* of the shift register 18, respectively. The stored value a is a present input from the electromagnetic pickup 5 and the stored value b is an immediately preceding input. The stored value c is an input preceding the immediately preceding input. The fetched values a, b and c are treated as a 3-digit binary number with the values a, b and c representing the first, second and third orders respectively. The flow of the routine then goes on to a step S2 at which the binary number is converted into a decimal value to be stored in a cylinder data value CYLRAM. That is to say, the cylinder data value CYLRAM is computed by using the following equation: CYLRAM=4c+2b+a.

The flow of the routine then proceeds to a step S3 at which the CPU 12 forms a judgment as to whether or not the cylinder data value CYLRAM is equal to 5. If is CYLRAM=5, the flow of the routine continues to a step S4 to form a judgment as to whether a first-judgment flag FFIRST is equal to 1. FFIRST=0 indicates that the cylinder data value CYLRAM has been judged at the step S3 to be equal to 5 for the first time since the start of the internal combustion engine. In this case, the flow of the routine goes on to a step S5 at which the first-judgment flag FFIRST is set at 1. The flow of the routine then proceeds to a step S6 at which the present stage is set at 0 (STAGE←0). STAGE=0 represents a specific rotation angular position. On the other hand, an outcome of the judgment formed at the step S4 showing that FFIRST=1 indicates that the judgment formed at the step S3 indicating a cylinder data value CYLRAM equal to 5 or a judgment formed at a step S9 to be described later indicating a cylinder data value CYLRAM equal to 1 has already been formed before. In this case, the flow of the routine continues to a step S7 to form a judgment as to whether or not the immediately preceding stage is 23 (STAGE=23). An outcome of the judgment showing that the immediately preceding stage is 23 (STAGE=23) indicates that the stages have been determined normally. In this case, the flow of the routine goes on to the step S6 at which the present stage is set at 0 (STAGE←0). On the other hand, an outcome of the judgment showing that the immediately preceding stage is not 23 (STAGE≠23) indicates that it is quite within the bounds of possibility that the routine has functioned incorrectly due to generation of noise. In this case, the flow of the routine proceeds to a step S8 at which a noise flag FNOISE is set at 1. Then, the flow of the routine immediately goes on to the step S6 at which the present stage is set at 0 (STAGE←0).

If the outcome of the judgment formed at the step S3 indicates that the cylinder data value is not equal to 5 (CYLRAM≠5), on the other hand, the flow of the routine proceeds to the step S9 to form a judgment as to whether or not the cylinder data value CYLRAM is equal to 1. If CYLRAM=1, the flow of the routine continues to a step S10 to form a judgment as to whether the first judgment flag FFIRST is equal to 1. FFIRST=0 indicates that the cylinder data value CYLRAM has been judged at the step S9 to be equal to 1 for the first time since the start of the combustion engine. In this case, the flow of the routine goes on to a step S11 at which the firstjudgment flag FFIRST is set at 1. The flow of the routine then proceeds to a step S12 at which the present stage is set at 12 (STAGE←12). STAGE=12 represents another specific rotation angular position.

On the other hand, an outcome of the judgment formed at the step S10 showing that FFIRST=1 indicates that the judgment formed at the step S3 indicating a cylinder data value CYLRAM equal to 5 or the judgment formed at the step S9 indicating a cylinder data value CYLRAM equal to 1 has already been formed before. In this case, the flow of the routine continues to a step S13 to form a judgment as to whether or not the immediately preceding stage is 21 (STAGE=21). If the immediately preceding stage is not 21 (STAGE≠21), the flow of the routine continues to a step S14 to form a judgment as to whether or not the immediately preceding stage is 11 (STAGE=11). An outcome of the judgment of the step S14 showing that the immediately preceding stage is 11 (STAGE=11) indicates that the stages have been determined normally. In this case, the flow of the routine goes on to the step S12 at which the present stage is set at 12 (STAGE←12). On the other hand, an outcome of the judgment of the step S14 showing that the immediately preceding stage is not 11 (STAGE≠11) indicates that it is quite within the bounds of possibility that the routine has functioned incorrectly due to generation of noise. In this case, the flow of the routine proceeds to a step S15 at which a noise flag FNOISE is set at 1. Then, the flow of the routine immediately goes on to the step S12 at which the present stage is set at 12 (STAGE←12).

If the outcome of the judgment formed at the step S9 indicates CYLRAM≠1, on the other hand, the flow proceeds to a step S16 at which the present stage is calculated by incrementing the immediately preceding stage by 1 (STAGE←STAGE+1). Also, if the outcome of the judgment formed at the step S13 indicates the immediately preceding stage is equal to 21 (STAGE=21), the flow proceeds to the step S16 as well. Then, the flow of the routine continues to a step S17 to form a judgment as to whether or not the present stage is 24 (STAGE=24). If the present stage is 24 (STAGE=24), the flow of the routine continues to a step S18 at which the present stage is set at 0 (STAGE←0). The flow of the routine then goes on to a step S19 at which a broken-wire flag FDANSEN is set at 1 to indicate a continuous state in which no cylinder pulses are generated due to a broken connection line of the electromagnetic pickup 5.

Figure 4:
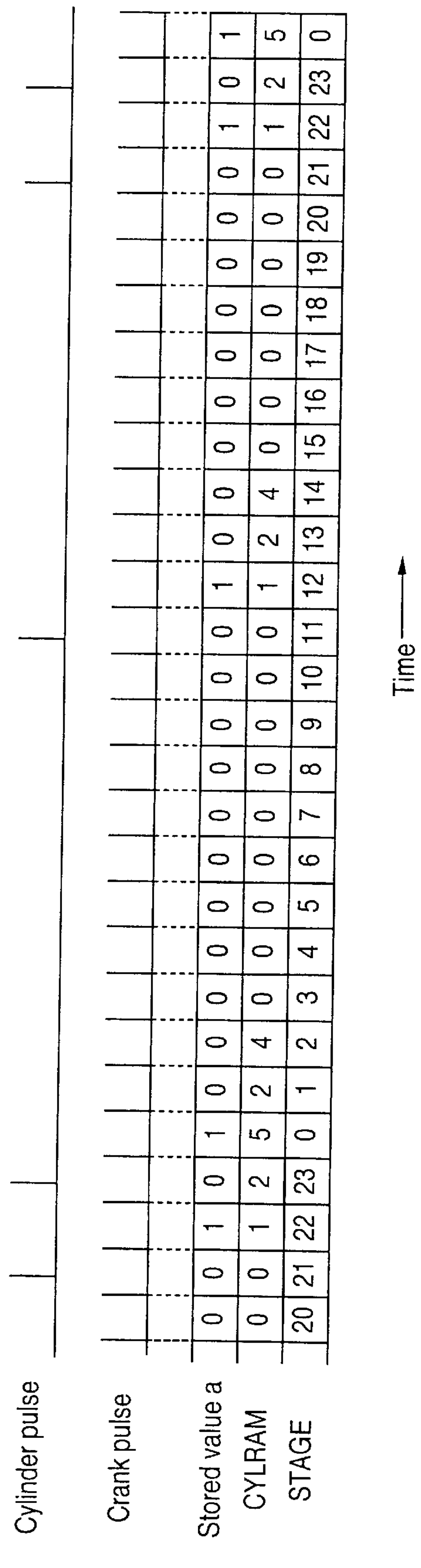
FIG. 4 is a diagram showing a relation among a cylinder pulse, a crank pulse, a stored value a, a cylinder data value CYLRAM and a stage STAGE which is obtained when stages are determined normally.

FIG. 4 is a diagram showing a relation among the cylinder pulse, the crank pulse, the stored value a, the cylinder data value CYLRAM and the stage STAGE which is obtained when the stages are determined normally. As shown in FIG. 4, when CYLRAM becomes equal to 5 to represent stored values a of 1, b of 0 and c of 1, the stage is reset to 0 (STAGE←0). When CYLRAM becomes equal to 1 to represent stored values a of 1, b of 0 and c of 0, on the other hand, the stage is set at 12 (STAGE←12) provided that the immediately preceding stage is not 21 (STAGE≠21).

For CYLRAM=5, the immediately preceding stage is examined to find out whether the stage is equal to 23 (STAGE=23). STAGE≠23 indicates that the stage has not been found correctly. Since it is quite within the bounds of possibility that a malfunction has occurred due to the generation of a noise, the noise flag FNOISE is set. In addition, for a cylinder data value equal to 1 (CYLRAM=1) and a stage unequal to 21 (STAGE≠21), the immediately preceding stage is examined to find out whether the stage is equal to 11 (STAGE=11). STAGE≠11 indicates that the stage has not been found correctly. Since it is quite within the bounds of possibility that a malfunction has occurred due to the generation of a noise, the noise flag FNOISE is set also in this case.

Figure 5:
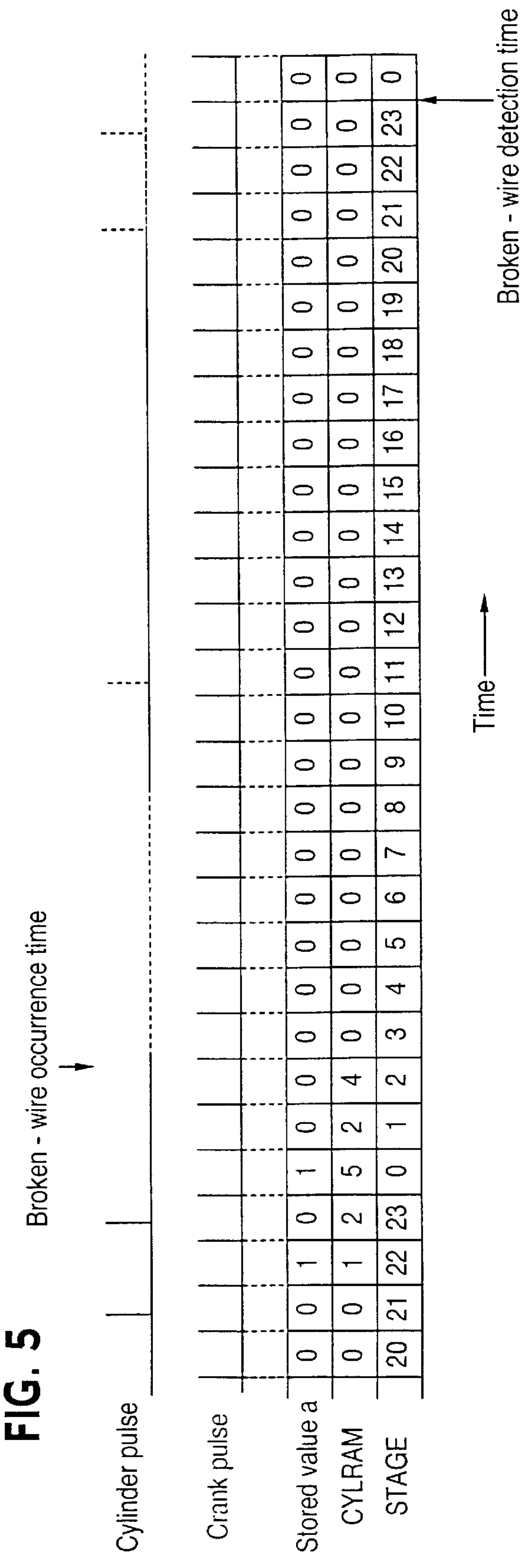
FIG. 5 is a diagram showing a relation among the cylinder pulse, the crank pulse, the stored value a, the cylinder data value CYLRAM and the stage STAGE which is obtained when a wire is broken.

When a line connecting the electromagnetic pickup 5 to the ECU 11 is broken at a point in time indicated as a broken-wire occurrence time shown in FIG. 5, no cylinder pulse is generated thereafter as indicated by a dashed line shown in FIG. 5. In this case, the stage is merely incremented (STAGE←STAGE+1) for each received crank pulse. At a point in time when the stage reaches 24 (STAGE=24), the stage is forcibly reset to 0 (STAGE=0). This point in time is shown in FIG. 5 as a broken-wire detection time. Then, the broken-wire flag FDANSEN is then set. It should be noted that the broken-wire flag FDANSEN is also set as well when no cylinder pulses are generated due to a failure occurring in the electromagnetic pickup 5 or a halted rotation of the rotor 3.

When the noise flag FNOISE or the broken-wire flag FDANSEN is set, a warning is typically output. As a result, it is possible to detect a failure and to check the operation with ease during maintenance work.

In the embodiment described above, a detection piece is electromagnetically detected by a pickup. It should be noted that a detection piece can also be detected optically. In addition, while a detection piece is formed into a protrusion, the shape of the detection piece is not limited to such a protrusion. For example, a detection piece for a rotor can be magnetically attached to the rotor.

Furthermore, the intervals at which the detection members are formed on the second rotor are not limited to the angles adopted in the embodiment. The detection members can be formed at other intervals. Moreover, the number of detection members does not have to be 3. That is to say, 4 or more detection members can be formed.

In addition, in the embodiment described above, a plurality of specific rotation angular positions of the first rotor are determined in accordance with detection results including the 2 most recent results of previous detection of the generation of the cylinder pulse (the second detection signal). It should be noted, however, that determination of the specific angular positions is not limited to such detection results. For example, the specific rotation angular positions of the first rotor can also be determined in accordance with a present detection result and 3 or more most recent results of the previous detection of the generation of the cylinder pulse.

As described above, according to the present invention, the rotation-angular-position detecting apparatus is provided with a second rotor which is rotated in a rotation interlocked with a first rotor with a plurality of first detection members formed at equal intervals in a rotational direction of the first rotor at a predetermined speed ratio with respect to the first rotor, and includes a plurality of second detection members formed at unequal intervals in a rotational direction of the second rotor; and a second pickup for generating a second detection signal when sensing the proximity of any one of the second detection members provided on the second rotor.

In the rotation-angular-position detecting apparatus generation of the second detection signal from the second pickup is detected for each generation of the first detection signal from the first pickup due to a rotation of the first rotor, and a plurality of specific rotation angular positions of the first rotor are each determined in accordance with a plurality of results of the detection obtained so far including a result of the detection of the generation of the second detection signal obtained this time. The number of times the first detection signal is generated after any one of the specific rotation angular positions has been determined is counted to determine a rotation angular position of the first rotor other than the specific rotation angular positions. Thus, once any one of the specific rotation angular positions has been determined, an angular position of the rotation can be confirmed. As a result, an angular position of a rotation of the first rotor can be confirmed within a relatively short period of time following a start of the rotation.

In addition, the rotation-angular-position detecting apparatus has a rotation-angular-position determining means which is used to form a judgment as to whether or not a rotation angular position determined at a determination immediately preceding a time to determine a rotation angular position is a rotation angular position immediately preceding the specific rotation angular position. If a rotation angular position determined at the immediately preceding determination is not a rotation angular position immediately preceding the specific rotation angular position, a malfunction caused by the generation of noise is judged to have occurred. As a result, it is possible to detect a failure and to check the operation with ease during maintenance work.

Furthermore, according to the rotation-angular-position detecting apparatus provided by the present invention, there is provided a means for forming a judgment as to whether or not the number of counted times the first detection signal has been generated exceeds the total number of rotation angular positions of the first rotor. Thus, an outcome of the judgment indicating that the number of counted times the first detection signal has been generated exceeds the total number of rotation angular positions of the first rotor can be interpreted as a broken wire in a connection system of the second pickup. As a result, it is also possible to detect a failure and to check the operation with ease during maintenance work.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotation-angular-position detecting apparatus for detecting an angular position of a rotation of a first rotor provided with a plurality of first detection members at equal intervals in a rotational direction of said first rotor for each of said intervals, said apparatus comprising:

a first pickup provided at a position in close proximity to a rotational locus of said plurality of first detection members provided on said first rotor and used for generating a first detection signal when sensing the proximity of any one of said first detection members;

a second rotor rotating in a rotation interlocked with said first rotor at a predetermined speed ratio with respect to said first rotor and having a plurality of second detection members provided at unequal intervals in a rotational direction of said second rotor;

a second pickup provided at a position in close proximity to a rotational locus of said plurality of second detection members provided on said second rotor and used for generating a second detection signal when sensing the proximity of any one of said second detection members;

a detection means for detecting the generation of said second detection signal for each generation of said first detection signal; and a rotation-angular-position determining means whereby a plurality of specific rotation angular positions of said first rotor are each determined in accordance with a plurality of results of detection of generation of said second detection signal output by said detection means so far including a result of detection of generation of said second detection signal output by said detection means this time, and the number of times said first detection signal is generated after any one of said specific rotation angular positions has been determined is counted to determine a rotation angular position of said first rotor other than said specific rotation angular positions.

2. The rotation-angular-position detecting apparatus according to claim 1, wherein said rotation-angular-position determining means is provided with a means which is used to form a judgment as to whether or not a rotation angular position determined at a determination immediately preceding a time to determine a rotation angular position is a rotation angular position immediately preceding said specific rotation angular position and, if a rotation angular position determined at said determination is not a rotation angular position immediately preceding said specific rotation angular position, a malfunction caused by said generation of noise is judged to have occurred.

3. The rotation-angular-position detecting apparatus according to claim 1, wherein said apparatus is provided with a means for forming a judgment as to whether or not the number of counted times said first detection signal has been generated exceeds the total number of rotation angular positions of said first rotor, and an outcome of said judgment indicating that said number of counted times said first detection signal has been generated exceeds said total number of rotation angular positions of said first rotor is interpreted as a broken wire in a connection system of said second pickup.

4. A rotation-angular-position detecting apparatus for detecting an angular position of a rotation of a first rotor provided with a plurality of first detection members spaced at equal intervals in a rotational direction of said first rotor for each of said intervals, said apparatus comprising:

a first detector for generating a first detection signal when sensing the proximity of any one of said first detection members;

a second rotor rotating in a rotation interlocked with said first rotor at a predetermined speed ratio with respect to said first rotor and having a plurality of second detection members provided at unequal intervals in a rotational direction of said second rotor;

a second detector for generating a second detection signal when sensing the proximity of any one of said second detection members;

a detection means for detecting the generation of said second detection signal for each generation of said first detection signal; and a rotation-angular-position determining means whereby a plurality of specific rotation angular positions of said first rotor are each determined in accordance with a plurality of results of the detection of the generation of said second detection signal outputted by said detection means and including a result of the detection of the generation of said second detection signal output by said detection means, and the number of times said first detection signal is generated after any one of said specific rotation angular positions has been determined is counted to determine a rotation angular position of said first rotor other than said specific rotation angular positions.

5. The rotation-angular-position detecting apparatus according to claim 4, wherein said rotation-angular-position determining means includes a judgment means for judging as to whether or not a rotation angular position determined at a determination immediately preceding a time to determine a rotation angular position is a rotation angular position immediately preceding said specific rotation angular position and, if a rotation angular position determined at said determination is not a rotation angular position immediately preceding said specific rotation angular position, a malfunction caused by said generation of noise is judged to have occurred.

6. The rotation-angular-position detecting apparatus according to claim 4, wherein said apparatus is provided with a means for forming a judgment as to whether or not the number of counted times said first detection signal has been generated exceeds the total number of rotation angular positions of said first rotor, and an outcome of said judgment indicating that said number of counted times said first detection signal has been generated exceeds said total number of rotation angular positions of said first rotor is interpreted as a broken wire in a connection system of said second pickup.

* * * * *